(12) United States Patent
Kobayashi et al.

(10) Patent No.: US 7,018,714 B2
(45) Date of Patent: Mar. 28, 2006

(54) NEAR-INFRARED ABSORPTION FILM

(75) Inventors: Taichi Kobayashi, Tokyo (JP);
Masayuki Matsuzaki, Tokyo (JP);
Masato Sugimachi, Kanagawa (JP);
Yasuhiro Morimura, Tokyo (JP)

(73) Assignee: Bridgestone Corporation, Tokyo (JP)

( * ) Notice: Subject to any disclaimer, the term of this patent is extended or adjusted under 35 U.S.C. 154(b) by 99 days.

(21) Appl. No.: 10/696,312

(22) Filed: Oct. 30, 2003

(65) Prior Publication Data

US 2005/0040378 A1    Feb. 24, 2005

Related U.S. Application Data

(63) Continuation of application No. PCT/JP02/04350, filed on May 1, 2002.

(30) Foreign Application Priority Data

May 1, 2001    (JP) .............................. 2001-134523
May 15, 2001   (JP) .............................. 2001-145602

(51) Int. Cl.
*B32B 9/04*    (2006.01)
*F21V 9/04*    (2006.01)
*G03G 5/16*    (2006.01)

(52) U.S. Cl. ................... 428/411.1; 430/944; 252/587; 250/316.1; 428/480

(58) Field of Classification Search ............... 359/350, 359/359; 252/587
See application file for complete search history.

(56) References Cited

U.S. PATENT DOCUMENTS

| 4,923,390 A | 5/1990 | Oguchi et al. |
| 5,145,963 A | 9/1992 | Nagai |
| 6,775,059 B1 * | 8/2004 | Kuwabara .................. 359/359 |

FOREIGN PATENT DOCUMENTS

| EP | 1 090 910 A1 | 4/2001 |
| JP | 62-32132 A | 2/1987 |
| JP | 63 227597 A | 9/1988 |
| JP | 01 061492 A | 3/1989 |
| JP | 2-29485 A | 1/1990 |
| JP | 02 036996 A | 2/1990 |
| JP | 4-25492 A | 1/1992 |
| JP | 5-104861 A | 4/1993 |
| JP | 9-179236 A | 7/1997 |
| JP | 9-230134 A | 9/1997 |
| JP | 9-309886 A | 12/1997 |
| JP | 10 045785 A | 2/1998 |
| JP | 10-78509 A | 3/1998 |
| JP | 11-316309 A | 11/1999 |

* cited by examiner

*Primary Examiner*—Rosemary Ashton
(74) *Attorney, Agent, or Firm*—Sughrue Mion, PLLC

(57) ABSTRACT

The present invention aims to provide a near-infrared absorption film having excellent near-infrared blocking properties and visible light transparency over a wide wavelength range, and attractive appearance. It further aims to provide a near-infrared absorption film having excellent near-infrared blocking properties, visible light transparency, good appearance and excellent durability such as anti-deterioration properties. The film may comprise a transparent substrate, and a near-infrared absorption layer containing a cyanine compound represented by the formula (1), and a diimonium compound.

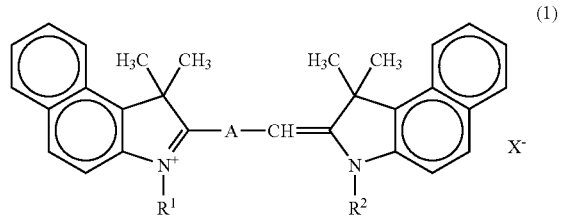

wherein, in the formula (1), A is a divalent bonding group comprising ethylene. $R^1$ and $R^2$ are monovalent groups comprising a carbon atom. $X^-$ is a monovalent anion. The film may also comprise a transparent substrate, and a near-infrared absorption layer containing a layer containing the cyanine compound represented by the formula (1) and a layer containing a diimonium compound.

11 Claims, 4 Drawing Sheets

NEAR-INFRARED ABSORPTION FILM

This is a Continuation of International Application No. PCT/JP02/04350 filed on May 1, 2002, the disclosure of which is incorporated herein by reference.

BACKGROUND OF THE INVENTION

1. Field of the Invention

The present invention relates to a near-infrared absorption film suitable for disposing on a front surface of a plasma display (PDP).

2. Description of the Related Art

In the related art, in general, in electromagnetic wave shield optically transmitting materials disposed on the front surfaces of plasma displays (PDP), a near-infrared ray absorption film which absorbs near-infrared rays that cause malfunctions of other peripheral electronic equipment, is affixed to the PDP side of the display. It is required that this near-infrared absorption film has a high selective near-infrared absorbing ability to effectively block near-infrared rays while having excellent visible light transparency and tone.

In order to satisfy the above requirements, various near-infrared absorption films have been studied and proposed in Japanese Patent Application Laid-Open UP-A) Nos. 09-230134, 10-78509 and 11-316309, but due to technical developments in recent years, infrared absorption films with still higher near-infrared ray blocking power, superior visible light transparency and better appearance have come to be required.

SUMMARY OF THE INVENTION

It is therefore a first object of the present invention to provide an infrared absorption film having an excellent near-infrared ray blocking performance and visible light transparency over a wide wavelength range, and an excellent tone.

It is a second object of the present invention to provide an infrared absorption film having an excellent near-infrared blocking performance and visible light transparency, an excellent tone, and durability such as anti-deterioration properties.

A near-infrared absorption film according to a first aspect is provided to attain the first object, and a near-infrared absorption film according to a second aspect is provided to attain the second object for a near-infrared absorption film of the present invention.

DESCRIPTION OF THE PREFERRED EMBODIMENTS

<First Aspect>

Figure 1:
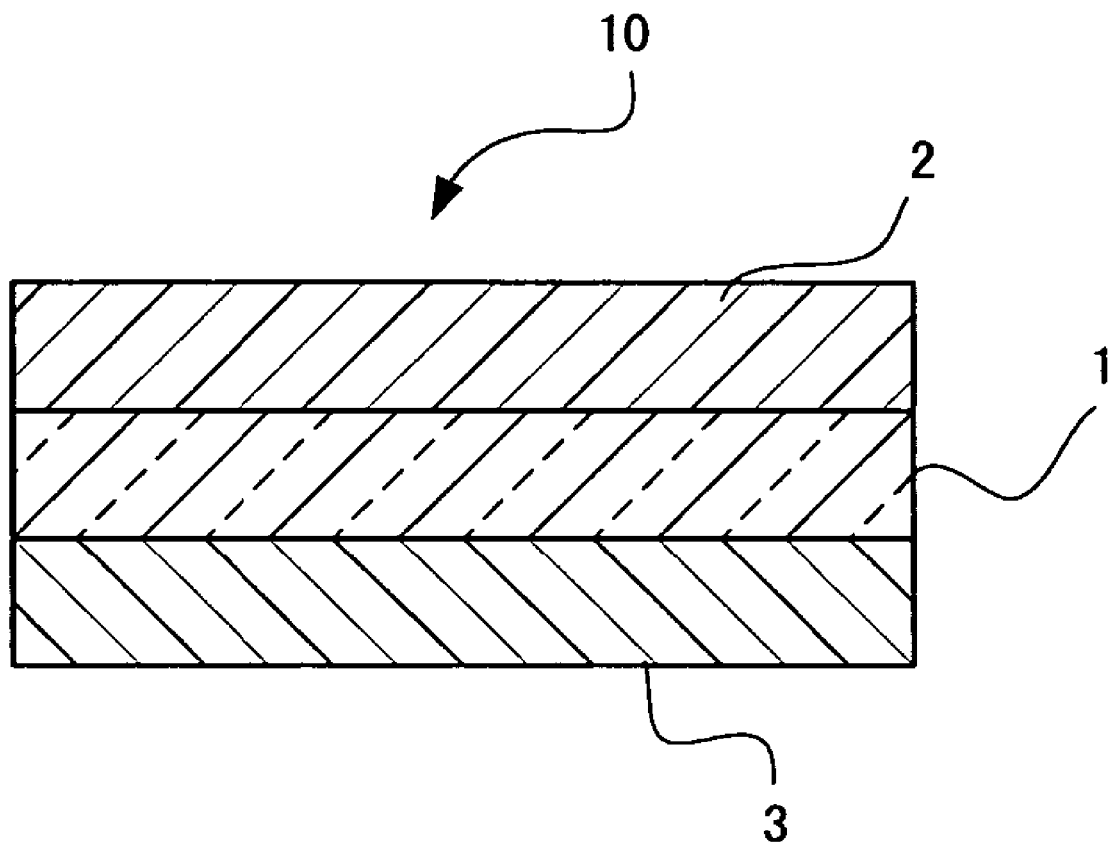
FIG. 1 is a schematic block diagram showing a cross-section of a near-infrared absorption film according to an example of the second aspect of the present invention.

In the present invention, the near-infrared absorption film of the aforesaid first aspect comprises a transparent ("transparence" refers to transparence to "visible light", hereafter idem) substrate, a near-infrared absorption layer, and other layers if required.

[Near-infrared Absorption Layer]

In the aforesaid first aspect, the near-infrared absorption layer contains a predetermined cyanine compound and a predetermined diimonium compound, and contains other components if required.

Compound

The cyanine compound is represented by the formula (1):

Formula (1):

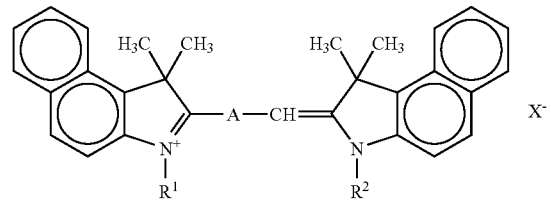

In the formula (1), "A" is a divalent bonding group comprising ethylene. "$R^1$" and "$R^2$" are monovalent groups comprising a carbon atom. "$X^-$" is a monovalent anion.

It is preferred that "A" in the formula (1) is one or more of the following formulae (2) to (4) from the viewpoint that they give the film an excellent near-infrared ray blocking performance, excellent visible light transparency and excellent tone.

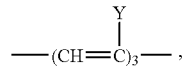

Formula (2)

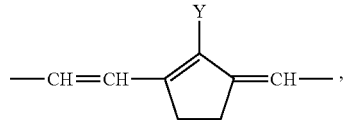

Formula (3)

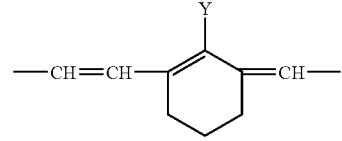

Formula (4)

In the formulae (2) to (4), "Y" is one of an alkyl group, a diphenylamino group, a halogen atom and a hydrogen atom.

In the formula (1), a specific example of the case where "A" is (3) is shown by the formula (5), a specific example of the case where "A" is (4) is shown by the formula (6), and a specific example of the case where "A" is (2) is shown by the formula (7), respectively.

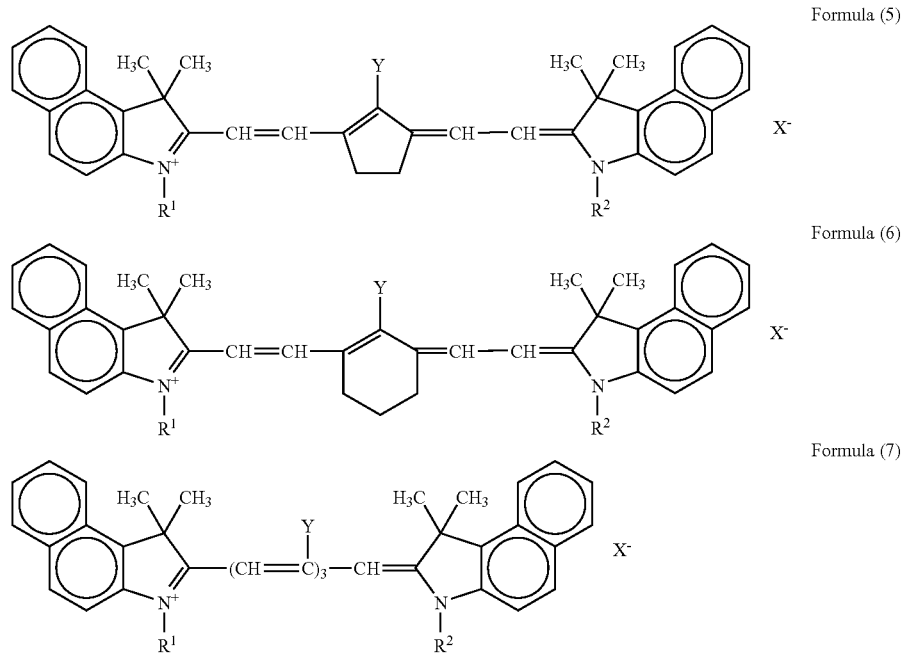

Formula (5)

Formula (6)

Formula (7)

In the formula (1), "$R^1$" and "$R^2$" may for example be alkyl, aryl, alkoxy, alkoxycarbonyl, sulfonylalkyl or cyano. "$X^-$" may for example be $I^-$, $Br^-$, $ClO_4^-$, $BF_4^-$, $PF_6^-$, $SbF_6^-$, $CH_3SO_4^-$, $NO_3^-$ or $CH_3-C_6H_4-SO_3^-$.

Diimonium Compound

There is no particular limitation on the aforesaid diimonium compound, but it may be one of the compounds represented by the following formulae (I) and (II):

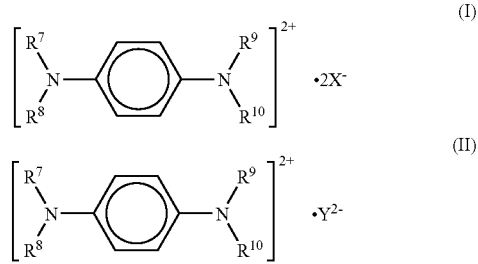

In the formulae (I) and (II), "$R^7$" to "$R^{10}$" are at least one of an alkyl group, an aryl group, a group containing an aromatic ring, a hydrogen atom and a halogen atom. "$X^-$" is a monovalent anion, and "$Y^{2-}$" is a divalent anion.

In the formula (I), the monovalent anion represented by "$X^-$" may be a halogen ion such as $I^-$, $Cl^-$, $Br^-$ or $F^-$, an inorganic acid ion such as $NO_3-$, $BF_4^-$, $PF_6^-$, $ClO_4^-$, $SbF_6^-$, an organic carboxylic acid ion such as $CH_3COO^-$, $CF_3COO^-$ or benzoic acid ion, an organic sulfonic acid ion such as $CH_3SO_3^-$, $CF_3SO_3^-$, benzenesulfonic acid ion or naphthalene sulfonic acid ion.

In the formula (II), the divalent anion represented by "$Y^{2-}$" is preferably an aromatic sulfonic acid ion having two sulfonic acid groups, for example an ion such as naphthalene-1,5-disulfonic acid, R acid, G acid, H acid, benzoyl H acid (benzoyl bonded to the amino group of H acid), p-chlorobenzoyl H acid, p-toluenesulfonyl H acid, chloro H acid (amino group of H acid replaced by chlorine atom), chloroacetyl H acid, methanyl γ acid, 6-sulfonaphthyl-γ acid, C acid, ε acid, p-toluenesulfonyl R acid, naphthalene disulfonic acid derivatives such as naphthalene-1,6-disulfonic acid and 1-naphthol-4,8-disulfonic acid, carbonyl-J-acid, 4,4-diaminostilbene-2,2'-disulfonic acid, di J acid, naphthalic acid, naphthalene-2,3-dicarboxylic acid, diphenic acid, stilbene-4,4'-dicarboxylic acid, 6-sulfo-2-oxy-3-naphthoic acid, anthraquinone-1,8-disulfonic acid, 1,6-diaminoanthraquinone-2,7-disulfonic acid, 2-(4-sulfophenyl)-6-aminobenzotriazol-5-sulfonic acid, 6-(3-methyl-5-pyrazolonyl)-naphthalene-1,3-disulfonic acid and 1-naphthol-6-(4-amino-3 sulfo) anilino-3-sulfonic acid. Among these, naphthalene disulfonic acid ion is preferred, the ion represented by the formula (III) being particularly preferred.

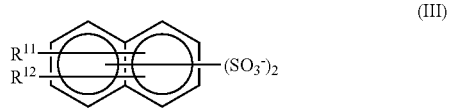

In the formula (III), "$R^{11}$" and "$R^{12}$" are at least one of a lower alkyl group, hydroxyl group, alkylamino group, amino group, $-NHCOR^{13}$, $-NHSO_2R^{13}$ and $-OSO_2R^{13}$ (where "$R^{13}$" represents at least one of an aryl and alkyl group, and "$R^{13}$" may have a substituent), acetyl group, hydrogen atom and halogen atom.

The aforesaid diimonium compound may be the compound represented by the formula (IV).

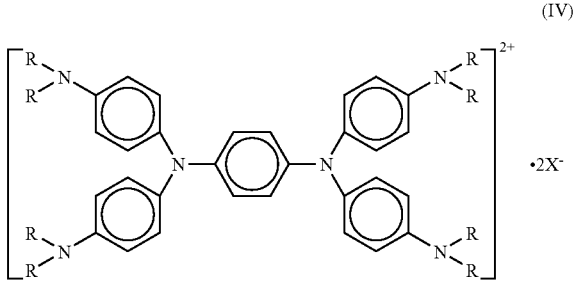

In the formula (IV), "R" is an alkyl group having 1 to 8 carbon atoms, n-butyl being particularly preferred. "X$^-$" may be $BF_4^-$, $PF_6^-$, $ClO_4^-$ or $SbF_6^-$. A preferred example of this diimonium compound is shown by the formula (V).

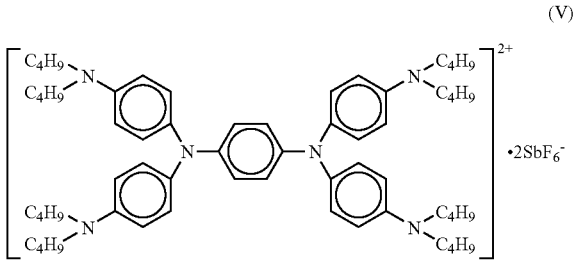

The anion represented by "X$^-$" in the formula (1) and the anion represented by "X$^-$" in the formula (I) are preferably identical, i.e., the counter anions in the aforesaid cyanine compound and diimonium compound, are preferably identical. If these ions are identical, a near-infrared absorption layer having excellent heat-resisting property and oxidation resistance is obtained.

The amount of the aforesaid diimonium compound is preferably at least 200 parts by weight, and more preferably 200 parts by weight to 2000 parts by weight, relative to 100 parts by weight of the aforesaid cyanine compound.

If the amount is more than 200 parts by weight, the diimonium compound not only has an excellent near-infrared absorption effect, but also has an excellent antioxidant effect on the aforesaid cyanine compound.

Other Components

Examples of other components are various binder resins, near-infrared absorbents other than the aforesaid diimonium compound (e.g., near-infrared absorbents such as those of the phthalocyanine, nickel complex, azo, polymethine, diphenylmethane, triphenylmethane and quinone types), antioxidants (e.g., antioxidants such as those of the phenol, amine, hindered phenol, hindered amine, sulfur, phosphoric acid, phosphorous acid and metal complex types), ultraviolet absorbers, colorants for making the film more attractive, pigments and dyes.

The binder resin may be a homopolymer or a copolymer of polyester resin, acrylic resin, methacrylic resin, urethane resin, silicone resin, phenol resin, polyethylene terephthalate (PET) resin, (meth)acrylic acid ester, and the like. Among these, acrylic resin and polyester resin are preferred from the viewpoint that the diimonium compound and cyanine compound have excellent dispersibility therein, and high durability is obtained.

It is preferred that the amount of cyanine compound is 0.1 parts by weight to 10 parts by weight and the amount of diimonium compound is 0.1 parts by weight to 20 parts by weight, and more preferred that the amount of cyanine compound is 0.1 parts by weight to 5 parts by weight and the amount of diimonium compound is 0.1 parts by weight to 10 parts by weight, relative to 100 parts by weight of the binder resin.

There is no particular limitation on the thickness of the near-infrared absorption layer described above, but from the viewpoint of near-infrared absorptivity and visible light transparency, it is preferably of the order of 0.5 μm to 50 μm.

[Transparent Substrate]

In the aforesaid first aspect, there is no particular limitation on the material of the transparent substrate, which may for example be a resin of polyolefine, e.g., polyethylene or polypropylene, the resin of polyester, acrylic, cellulose, polyvinyl chloride, polycarbonate, phenolic or urethane, a polyethylene terephthalate (PET) resin, and the like. Among these, polyester resin is particularly preferred in respect of transparency and environmental robustness.

There is no particular limitation on the thickness of the transparent substrate, but from the viewpoints of mechanical strength and thinness, it is preferably of the order of 50 μm to 200 μm.

[Manufacture of Near-infrared Absorption Film according to the First Aspect]

There is no particular limitation on the method of manufacturing the near-infrared absorption film according to the first aspect, for example, the aforesaid cyanine compound, diimonium compound and binder resin are dissolved in a predetermined solvent to prepare a coating solution which is then coated on the transparent substrate surface. The predetermined solvent may for example be dichloromethane, methyl ethyl ketone, tetrahydrofuran, cyclohexanone, and the like.

[Composition of Near-infrared Absorption Film according to the First Aspect]

There is no particular limitation on the composition of the near-infrared absorption film according to the first aspect, but it is preferred that the near-infrared absorption layer is a single layer as this makes it very easy to manufacture, and permits it to be made thinner.

<Second Aspect>

In the present invention, the near-infrared absorption film of the aforesaid second aspect has a transparent substrate, a near-infrared absorption layer and other layers if required.

[Near-infrared Absorption Layer]

In the second aspect, the near-infrared absorption layer has a layer containing a cyanine compound, a layer containing a diimonium compound and other layers if required.

In the second aspect, in the near-infrared absorption layer, as mentioned above, it is required that the cyanine compound and diimonium are contained in separate layers for the following reasons [1] to [3].

[1] As both the cyanine compound and the diimonium compound possess counter anions, by containing these moieties in separate layers, it is unnecessary to provide counter anions. As a result, there is a larger degree of freedom of combinations of the cyanine compound and diimonium compound.

[2] The quencher compounds (antidegradant components) which act more effectively due to the cyanine compound and diimonium compound, mutually differ. For this reason, by providing separate layers containing the cyanine compound and diimonium compound, the quencher compound which acts more effectively can be used for each layer, and the material excels in durability.

[3] If the cyanine compound and diimonium compound are made to coexist in the same layer, degradation of the diimonium compound is accelerated. Therefore, by providing separate layers containing these moieties, accelerated degradation of the diimonium compound can be avoided, and the material excels in durability.

Cyanine Compound-containing Layer

The cyanine compound is the same cyanine compound described for the first aspect represented by the aforesaid formula (1).

The amount of the cyanine compound is preferably 0.1 parts by weight to 50 parts by weight, and more preferably 1 part by weight to 50 parts by weight, relative to 100 parts by weight of the diimonium compound described later.

If this amount is less than 0.1 parts by weight, near-infrared blocking properties may be insufficient, and if 50 parts by weight are exceeded, visible light transparency may be insufficient.

The layer containing the cyanine compound can be made to contain various other components if desired. Among these other components, quencher compounds are preferred from the viewpoint that oxidation of the cyanine compound is prevented, and a near-infrared absorption film with high durability is obtained.

There is no particular limitation on the quencher compound, but in order to more easily prevent oxidation of the cyanine compound and obtain a near-infrared absorption film having excellent durability, it is preferably at least one or both of a metal compound having a structure represented by at least one of the formula (5) and the formula (6), and an aminium compound having the structure represented by the formula (7).

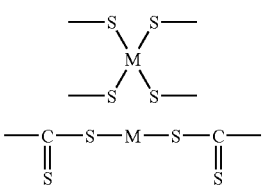

Formula (5)

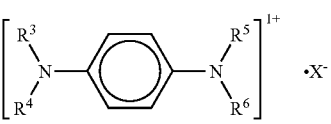

Formula (6)

In the formulae (5) and (6), "M" is at least one of Ni, Cu, Co, Pt and Pd.

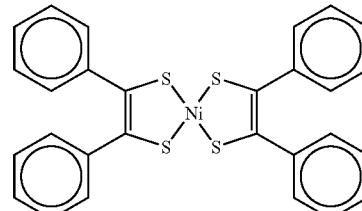

Formula (7)

In the formula (7), "$R^3$" to "$R^6$" are at least one of an alkyl group, an aryl group, a group having an aromatic ring, a hydrogen atom and a halogen atom. "$X^-$" is at least one of $I^-$, $Br^-$, $ClO_4^-$, $BF_4^-$, $PF_6^-$, $SbF_6^-$, $CH_3SO_4-$, $NO_3^-$, and $CH_3—C_6H_4—SO_3^-$.

The metal compound having the structure represented by the formula (5) may be a 1,2-benzene thiol-copper complex, 1,2-benzene thiol nickel complex or a bis-dithio benzyl nickel complex, but the metal compounds having the structure represented by the formulae (8) to (10) are more preferred from the viewpoint of anti-oxidation and durability.

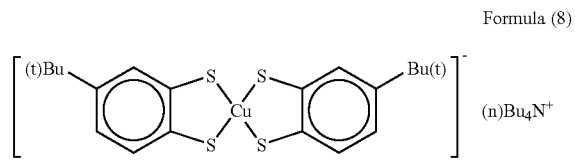

Formula (8)

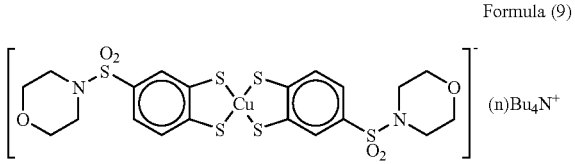

Formula (9)

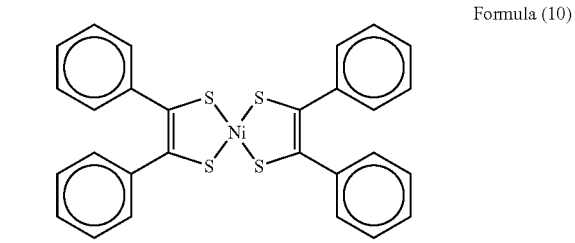

Formula (10)

As the metal compound having the structure shown by the formula (6), the metal complex having the structure represented by the formula (11) is more preferred from the viewpoint of anti-oxidation and durability.

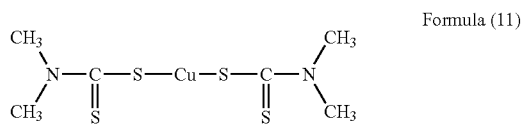

Formula (11)

Among quencher compounds, the quencher compounds represented by the formula (5) and the formula (7) are preferred from the viewpoint of durability improvement, and among the quencher compounds represented by the formula (5), the quencher compound represented by the formula (10) is particularly preferred.

The amount of quencher compound in the aforesaid near-infrared absorption layer is preferably 0.1 parts by weight to 1000 parts by weight, more preferably 1 part by weight to 500 parts by weight and still more preferably 1 part by weight to 100 parts by weight, relative to 100 parts by weight of the aforesaid cyanine compound.

If the amount thereof is less than 0.1 parts by weight, durability improvements such as heat resistance, anti-oxidation properties and moisture resistance may not be sufficient, and if it is more than 1000 parts by weight, the near-infrared absorption layer may develop a coloration and the appearance of the near-infrared absorption film may be impaired.

Examples of other components contained in the layer containing the aforesaid cyanine compound in addition to the quencher compound are various binder resins, near-infrared absorption agents other than the cyanine compound (e.g., near-infrared absorption agents such as phthalocyanines, nickel complexes, azo compounds, polymethine compounds, diphenylmethanes, triphenylmethanes, quinines and the like), antioxidants other than the quencher compound (e.g., antioxidants such as phenols, amines, hindered phenols, hindered amines, sulfur compounds, phosphoric acids, phosphorous acids, metal complexes, and the like), ultraviolet absorbers, colorants to improve the appearance of the film, pigments, dyes, and the like.

The binder resin may be a homopolymer or a copolymer of polyester resin, acrylic resin, methacrylic resin, urethane resin, silicone resin, phenol resin, polyethylene terephthalate (PET resin), (meth)acrylic acid ester and the like. Among these, from the viewpoint that dispersion of the cyanine compound, diimonium compound and quencher compound therein is excellent, and durability is good, acrylic resin and polyester resin are preferred.

There is no particular limitation on the thickness of the layer containing the cyanine compound, but from the viewpoint of infrared absorption properties and visible light transparency, it is preferably of the order of 0.1 µm to 20 µm.

Diimonium Compound-containing Layer

There is no particular limitation on the diimonium compound, but as in the case of the aforesaid first aspect, the compound represented by one of the aforesaid (I) and (II) is suitable.

The layer containing the diimonium compound may contain various other components if desired. As these other components, the aforesaid quencher compound is particularly preferred from the viewpoint that it more conveniently prevents oxidation of the diimonium compound and allows a near-infrared absorption film having excellent durability to be obtained. Specific examples of the quencher compound are completely identical to those described above. Among quencher compounds, from the viewpoint of durability improvement, quencher compounds represented by the formula (5) is preferred, and among quencher compounds represented by the formula (5), quencher compounds represented by the formula (8) and the formula (9) are more preferred, and quencher compounds represented by the formula (9) are particularly preferred.

The other components contained in the layer containing the diimonium compound may be completely identical to those mentioned in "other components contained in the layer containing the cyanine compound".

There is no particular limitation on the thickness of the layer containing the diimonium compound, but from the viewpoint of near-infrared absorption properties and visible light transparency, it is preferably of the order of 0.1 µm to 20 µm.

[Transparent Substrate]

In the aforesaid second aspect, the transparent substrate may be identical to the transparent substrate described in the first aspect.

[Manufacture of Near-infrared Absorption Film according to the Second Aspect]

There is no particular limitation on the method of manufacturing the near-infrared absorption film according to the second aspect, for example, a coating solution obtained by dissolving the cyanine compound and a binder resin in a predetermined solvent, and a coating solution obtained by dissolving the diimonium compound and a binder resin in a predetermined solvent, may be prepared, and coated on the transparent substrate. The predetermined solvent may for example be dichloromethane, methyl ethyl ketone, tetrahydrofuran, cyclohexanone, and the like.

[Composition of the Near-infrared Absorption Film according to the Second Aspect]

There is no particular limitation on the composition of the near-infrared absorption film according to the second aspect provided that the near-infrared absorption layer comprises a layer containing the aforesaid cyanine compound and a layer containing the aforesaid diimonium compound, for example as shown in FIGS. 1 through 4.

Figure 2:
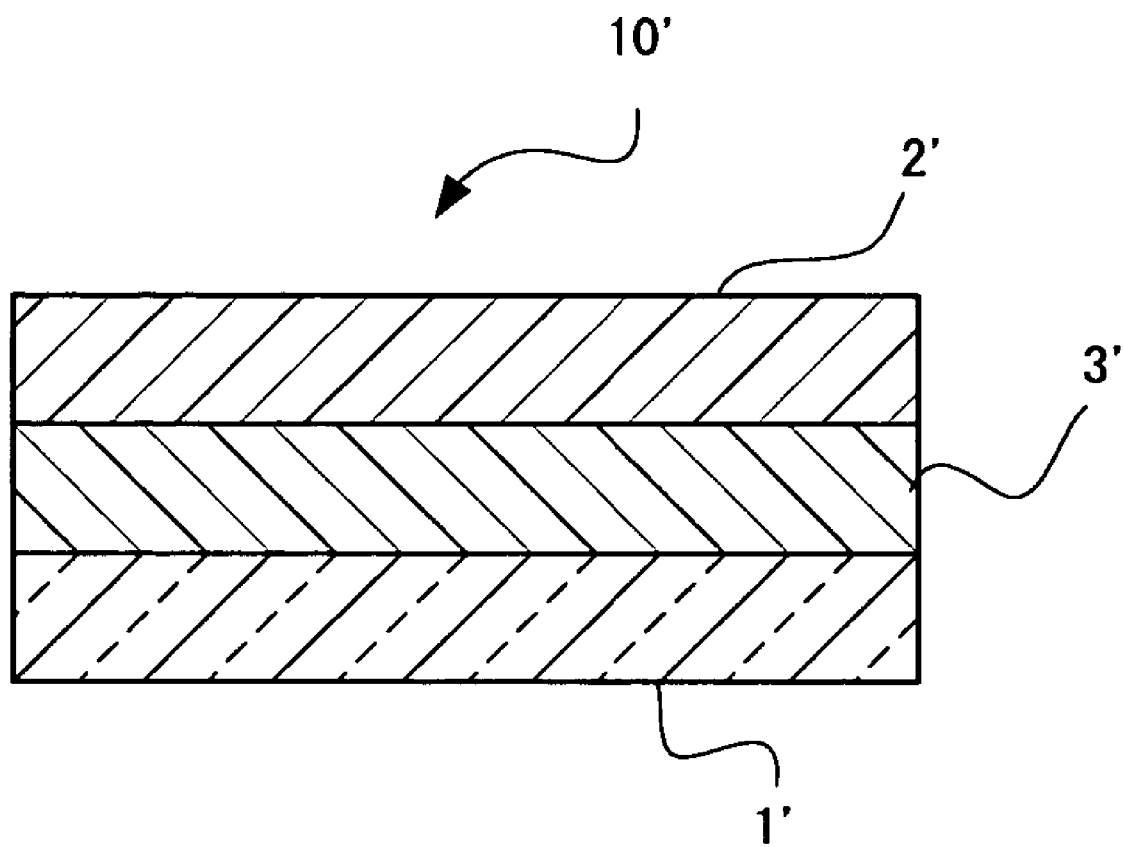
FIG. 2 is a schematic block diagram showing a cross-section of a near-infrared absorption film according to an example of the second aspect of the present invention.
Figure 3:
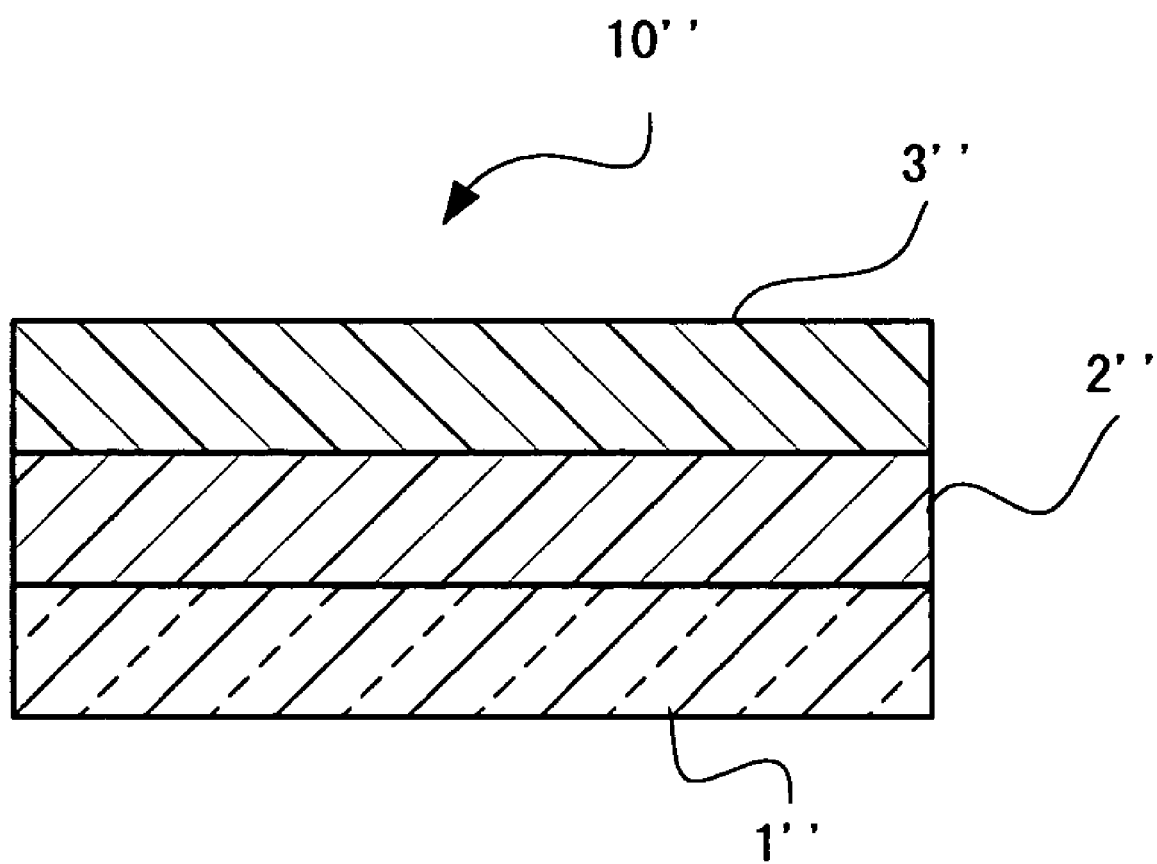
FIG. 3 is a schematic block diagram showing a cross-section of a near-infrared absorption film according to an example of the second aspect of the present invention.
Figure 4:
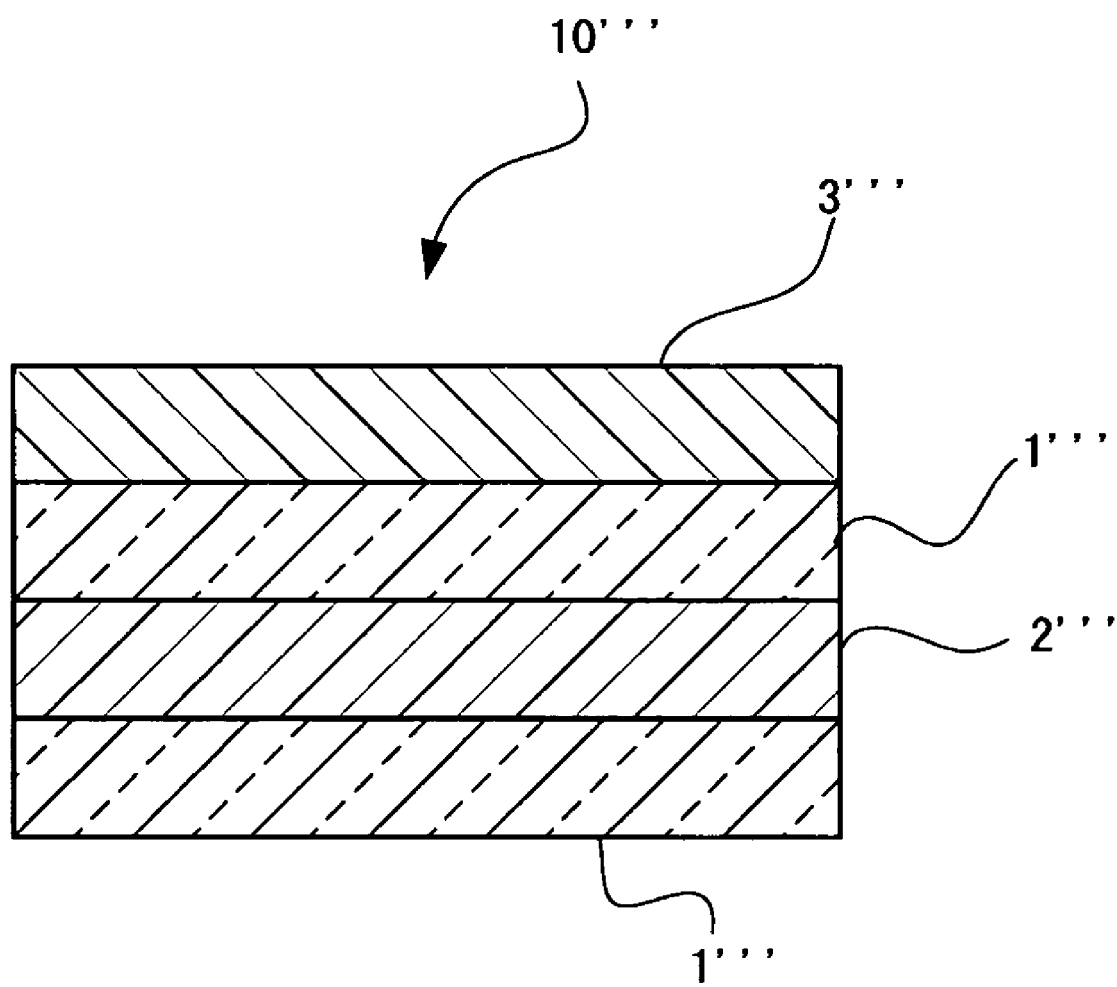
FIG. 4 is a schematic block diagram showing a cross-section of a near-infrared absorption film according to an example of the second aspect of the present invention.

FIGS. 1 through 4 are schematic diagrams showing a cross-section of the near-infrared absorption film in the present invention according to the second aspect. In FIG. 1, a near-infrared absorption film 10 comprises a layer 2 containing a cyanine compound and a layer 3 containing a diimonium compound on the two surfaces of a transparent substrate 1. In FIG. 2, a near-infrared absorption film 10' comprises a layer 3' containing a diimonium compound and a layer 2' containing a cyanine compound on a transparent substrate 1' in that order. In FIG. 3, a near-infrared absorption film 10" comprises a layer 2" containing a cyanine compound and a layer 3" containing a diimonium compound on a transparent substrate 1" in that order. In FIG. 4, a near-infrared absorption film 10'" comprises a layer 2'" containing a cyanine compound, a transparent substrate 1'" and a layer 3'" containing a diimonium compound on a transparent substrate 1'" in that order.

The present invention will now be described by means of specific examples, but it should be understood that the present invention is not be construed as being limited in any way thereby.

EXAMPLES AND COMPARATIVE EXAMPLES ACCORDING TO THE FIRST ASPECT

Examples 1 to 8, Comparative Examples 1 to 7

Manufacture of Near-infrared Absorption Film

The amounts of the near-infrared absorption agents and binder resins respectively shown in the "near-infrared absorption agents" and "binder resins" of Tables 1 to 2, were dissolved in a mixed solution of 18.5 g dichloromethane, 55.5 g tetrahydrofuran and 18.5 g cyclohexanone to prepare a coating solution. The coating solution obtained was coated by a bar coater on the surface of a polyester film (transparent substrate, T600E/W07 grade, Mitsubishi Polyester Film Corporation) of width 200 mm and thickness 100 µm, and dried at 100° C. for 3 minutes to form a near-infrared absorption layer (5 µm). In this way, a near-infrared absorption film was manufactured.

This infrared absorption film was evaluated together with a film adjusted by red dye (BRDOU) and blue dye (BLUE-S, Sumitomo Chemical Company Limited) so that the chromaticity (X, Y) was (0.310, 0.316).

TABLE 1

| | Near infrared adsorption agent | | | Binder resin | | |
|---|---|---|---|---|---|---|
| Example | Compound | Product name | g | Compound | Product name | g |
| Ex. 1 | Diimonium compound | CIR1081 | 0.48 | Polyester resin | UE3690 | 7.5 |
| | Cyanine compound | NK5578 | 0.063 | | | |

TABLE 1-continued

| Example | Near infrared adsorption agent | | | Binder resin | | |
|---|---|---|---|---|---|---|
| | Compound | Product name | g | Compound | Product name | g |
| Ex. 2 | Diimonium compound | IRG022 | 0.48 | Polyester resin | UE3690 | 7.5 |
| | Cyanine compound | NK5578 | 0.063 | | | |
| Ex. 3 | Diimonium compound | CIR1081 | 0.48 | Polyester resin | UE3690 | 7.5 |
| | Cyanine compound | NK5706 | 0.075 | | | |
| Ex. 4 | Diimonium compound | IRG022 | 0.48 | Polyester resin | UE3690 | 7.5 |
| | Cyanine compound | NK5706 | 0.075 | | | |
| Ex. 5 | Diimonium compound | NIR-IM2 | 0.48 | Polyester resin | UE3690 | 7.5 |
| | Cyanine compound | NK5706 | 0.075 | | | |
| Ex. 6 | Diimonium compound | CIR1081 | 0.48 | Polymethyl methacrylate | 80N | 7.5 |
| | Cyanine compound | NK5706 | 0.066 | | | |
| Ex. 7 | Diimonium compound | IRG022 | 0.48 | Polymethyl methacrylate | 80N | 7.5 |
| | Cyanine compound | NK5706 | 0.063 | | | |
| Ex. 8 | Diimonium compound | CIR1080 | 0.48 | Polymethyl methacrylate | 80N | 7.5 |
| | Cyanine compound | NK2014 | 0.03 | | | |
| | Cyanine compound | NK2911 | 0.033 | | | |

TABLE 2

| Comparative Example | Near infrared absorption agent | | | Binder resin | | |
|---|---|---|---|---|---|---|
| | Compound | Product name | g | Compound | Product name | g |
| Comp. Ex. 1 | Diimonium compound | CIR1081 | 0.48 | Polyester resin | UE3690 | 7.5 |
| | Phthalocyanine compound | EX811K | 0.45 | | | |
| Comp. Ex. 2 | Diimonium compound | CIR1081 | 0.48 | Polyester resin | UE3690 | 7.5 |
| | Metal complex | MIR101 | 0.36 | | | |
| Comp. Ex. 3 | Diimonium compound | CIR1081 | 0.48 | Polymethylmethacrylate | 80N | 7.5 |
| | Metal complex | MIR101 | 0.38 | | | |
| Comp. Ex. 4 | Diimonium compound | CIR1081 | 0.48 | Polymethylmethacrylate | 80N | 7.5 |
| | Metal complex | SIR128 | 0.38 | | | |
| Comp. Ex. 5 | Cyanine compound | NK5706 | 0.075 | Polyester resin | UE3690 | 7.5 |
| Comp. Ex. 6 | Diimonium compound | CIR1081 | 0.48 | Polyester resin | UE3690 | 7.5 |
| Comp. Ex. 7 | Diimonium compound | CIR1081 | 1.2 | Polyester resin | UE3690 | 7.5 |

In Tables 1 and 2, [NK5578], [NK5706], [NK2014] and [NK2911] are cyanine compounds manufactured by Hayashibara Biochemical laboratories, Inc. (for [NK5578], "A" in the formula (1) is represented by the formula (3) (wherein, "Y" in the formula (3) is diphenylamine), and "X−" is $SbF_6^-$. For [NK5706], "A" in the formula (1) is the formula (4) (wherein, "Y" in the formula (4) is Cl−) and "X−" is $SbF_6^-$. For [NK2014], "A" in the formula (1) is represented by the formula (2) (wherein, "Y" in the formula (2) is a hydrogen atom), and "X−" is $ClO_4^-$. For [NK2911], "A" in the formula (1) is represented by the formula (3) (wherein, "Y" in the formula (3) is diphenylamine), and "X−" is $ClO_4^-$. [CIR1080] and [CIR1081] are manufactured by Japan Carlit Co., Ltd. (wherein, for [CIR1080], "X−" in the formula (1) is $ClO_4^-$, and for [CIR1081], "X−" in the formula (1) is $SbF_6^-$). [IRG022] is manufactured by Nippon Kayaku Co., Ltd. ("X−" is $SbF_6^-$), [NIR-IM2] is manufactured by Teikoku Chemical Industries (X− is $SbF_6^-$), [EX811K] is manufactured by Nippon Shokubai Co., Ltd., [MIR101] is manufactured by Midori Kagaku Co., Ltd., [SIR128] is manufactured by Mitsui Toatsu Chemicals, [UE3690] is a polyester resin [Elitel UE3690] manufactured by Unitika Ltd., and [80N] is a polymethylmethacrylate resin [Delpet 80N] manufactured by Asahikasei Corporation.

<Evaluation>

Measurement of Near-infrared Transmittance and Luminous Transmittance

On the obtained near-infrared absorption films, the near-infrared transmittance thereof, and the luminous transmittance thereof under a light source C of JIS Z 8720 were measured with using a spectrophotometer (U-4000, Hitachi Measuring Instruments) based on JIS Z 8722.

If the luminous transmittance was 70% or more, the film was rated O, and if it was less than 70%, it was rated X. For near-infrared transmittance, if the transmittances in the wavelength region of 800 nm to 1100 nm were all less than 20%, the film was rated O, and if the transmittance was 20% or more, the film was rated X. Tables 3 and 4 show the results.

Durability Test

The near-infrared absorption films obtained were subjected to two durability tests, i.e., leaving the film at 80° C. for 500 hours, and leaving the film under a carbon arc using a sunshine weather meter (Suga tester) at an irradiation intensity of 100 W/m² for 24 hours. Subsequently, the durability (heat resistance and antioxidation properties) was evaluated according to the following evaluation criteria. Tables 3 and 4 show the results.

Durability Test Criteria excellent durability . . . ⊚ very good durability, no problem in practice . . . O inferior durability . . . X

TABLE 3

| Example No. | | Ex. 1 | Ex. 2 | Ex. 3 | Ex. 4 | Ex. 5 | Ex. 6 | Ex. 7 | Ex. 8 |
|---|---|---|---|---|---|---|---|---|---|
| Near infrared transmittance (%) | 800 nm | 19.7 | 19.7 | 19.5 | 19.5 | 19.5 | 19.1 | 19.1 | 17.5 |
| | 850 nm | 4.6 | 4.6 | 2.7 | 2.7 | 2.7 | 3.5 | 3.5 | 4.0 |
| | 900 nm | 9.5 | 9.5 | 6.5 | 6.5 | 6.5 | 6.7 | 6.7 | 6.5 |
| | 950 nm | 4.3 | 4.3 | 4.3 | 4.3 | 4.3 | 4.7 | 4.7 | 4.7 |
| | 1000 nm | 3.4 | 3.4 | 3.5 | 3.5 | 3.5 | 4.2 | 4.2 | 4.2 |
| | 1100 nm | 2.1 | 2.1 | 2.1 | 2.1 | 2.1 | 2.4 | 2.4 | 2.4 |
| | MAX | 19.7 | 19.7 | 19.5 | 19.5 | 19.5 | 19.1 | 19.1 | 17.5 |
| Luminous transmittance (%) | | 74.2 | 74.2 | 71.6 | 71.6 | 71.6 | 73.4 | 73.4 | 72.1 |
| Chromaticity | x | 0.310 | 0.310 | 0.310 | 0.310 | 0.310 | 0.310 | 0.310 | 0.310 |
| | y | 0.316 | 0.316 | 0.316 | 0.316 | 0.316 | 0.316 | 0.316 | 0.316 |
| Visible light transmittance rating | | ○ | ○ | ○ | ○ | ○ | ○ | ○ | ○ |
| Near infrared transmittance rating | | ○ | ○ | ○ | ○ | ○ | ○ | ○ | ○ |
| Durability rating | | ◎ | ◎ | ◎ | ◎ | ◎ | ◎ | ◎ | ◎ |

TABLE 4

| Comparative Example No. | | Comp. Ex. 1 | Comp. Ex. 2 | Comp. Ex. 3 | Comp. Ex. 4 | Comp. Ex. 5 | Comp. Ex. 6 | Comp. Ex. 7 |
|---|---|---|---|---|---|---|---|---|
| Near infrared transmittance (%) | 800 nm | 19.8 | 19.7 | 19.6 | 19.9 | 35.9 | 49.1 | 19.6 |
| | 850 nm | 4.0 | 5.3 | 6.4 | 6.4 | 8.2 | 29.3 | 5.4 |
| | 900 nm | 3.0 | 2.6 | 3.5 | 3.4 | 50.8 | 11.6 | 0.5 |
| | 950 nm | 3.5 | 2.1 | 3.1 | 3.1 | 87.7 | 4.4 | 0.1 |
| | 1000 nm | 3.2 | 2.8 | 3.6 | 3.7 | 91.4 | 3.4 | 0.0 |
| | 1100 nm | 2.1 | 2.1 | 2.4 | 2.4 | 91.2 | 2.1 | 0.0 |
| | MAX | 19.8 | 19.7 | 19.6 | 19.9 | 91.6 | 49.1 | 19.6 |
| Luminous transmittance (%) | | 61.7 | 63.9 | 68.1 | 68.5 | 84.1 | 76.5 | 60.3 |
| Chromaticity | x | 0.310 | 0.310 | 0.310 | 0.310 | 0.310 | 0.310 | 0.310 |
| | y | 0.316 | 0.316 | 0.316 | 0.316 | 0.316 | 0.316 | 0.316 |
| Visible light transmittance rating | | X | X | X | X | ○ | ○ | X |
| Near infrared transmittance rating | | ○ | ○ | ○ | ○ | X | X | ○ |
| Durability rating | | ○ | ○ | ○ | ○ | X | ○ | ○ |

From Tables 3 and 4, it is seen that, in Examples 1 to 8 as compared to Comparative Examples 1 to 7, near-infrared blocking properties and visible light transparency are both excellent.

EXAMPLES AND COMPARATIVE EXAMPLES IN THE SECOND ASPECT

Examples 9 to 13, Comparative Examples 8 to 9

Manufacture of Near-infrared Absorption Film

The "near-infrared absorption agents" and "binder resins" shown in the "first layer" in the Examples and Comparative Examples of Tables 5 and 6 were dissolved in a mixed solvent comprising 18.5 g dichloromethane, 55.5 g methyl ethyl ketone and 18.5 g cyclohexanone to prepare a coating solution. The coating solution obtained was coated on a polyester film (transparent substrate) of width 200 mm and thickness 100 μm, and the coating was dried at 100° C. for 3 minutes to form a first layer (thickness: 5 μm) on the transparent substrate surface.

Next, the "near-infrared absorption agents" and "binder resins" shown in the "second layer" in the Examples and Comparative Examples of Tables 5 and 6 were dissolved in a mixed solvent comprising 18.5 g dichloromethane, 55.5 g tetrahydrofuran and 18.5 g cyclohexanone to prepare a coating solution. The coating solution obtained was coated on the opposite surface of the transparent substrate to that on which the first layer was formed, and the coating was dried at 100° C. for 3 minutes to form a second layer (thickness: 5 μm). In this way, a near-infrared absorption film was manufactured.

The infrared absorption film obtained was evaluated together with a film adjusted by red dye (BRDOU) and blue dye (BLUE-S, Sumitomo Chemical Company Limited) so that the chromaticity (X, Y) was (0.310, 0.316).

Comparative Examples 10 to 11

Manufacture of Near-infrared Absorption Film

The "near-infrared absorption agents" and "binder resins" shown in the Comparative Examples of Table 6 were dissolved in a mixed solvent comprising 18.5 g dichloromethane, 55.5 g methyl ethyl ketone and 18.5 g cyclohexanone to prepare a coating solution. The coating solution obtained was coated on a polyester film (transparent substrate) of width 200 mm and thickness 100 μm, and the coating was dried at 100° C. for 3 minutes to form a near-infrared absorption layer (thickness: 10 μm) on the transparent substrate surface. In this way, a near-infrared absorption film was manufactured.

The infrared absorption film obtained was evaluated together with a film adjusted by red dye (BRDOU) and blue dye (BLUE-S, Sumitomo Chemical Company Limited) so that the chromaticity (X, Y) was (0.310, 0.316).

TABLE 5

| Example No. | Layer | Near infrared absorption agent | | | Binder resin | | |
|---|---|---|---|---|---|---|---|
| | | Compound name | Product name | g | Compound name | Product name | g |
| Ex. 9 | 1st layer | Cyanine compound | NK2911 | 0.065 | Polyester | UE3690 | 7.5 |
| | | Quencher (metal complex) | MIR101 | 0.03 | | | |
| | 2nd layer | Diimonium compound | CIR1081 | 0.48 | Polyester | UE3690 | 7.5 |
| | | Quencher (metal complex) | EST5 | 0.02 | | | |
| Ex. 10 | 1st layer | Cyanine compound | NK2911 | 0.065 | Polyester | UE3690 | 7.5 |
| | | Quencher (aminium) | CIR960 | 0.025 | | | |
| | 2nd layer | Diimonium compound | CIR1081 | 0.48 | Polyester | UE3690 | 7.5 |
| | | Quencher (metal complex) | EST5 | 0.02 | | | |
| Ex. 11 | 1st layer | Cyanine compound | NK2911 | 0.063 | Polymethylmethacrylate | 80N | 7.5 |
| | | Quencher (metal complex) | MIR101 | 0.03 | | | |
| | 2nd layer | Diimonium compound | CIR1081 | 0.48 | Polymethylmethacrylate | 80N | 7.5 |
| | | Quencher (metal complex) | EST5 | 0.02 | | | |
| Ex. 12 | 1st layer | Cyanine compound | NK2911 | 0.063 | Polymethylmethacrylate | 80N | 7.5 |
| | | Quencher (aminium) | CIR960 | 0.024 | | | |
| | 2nd layer | Diimonium compound | CIR1081 | 0.48 | Polymethylmethacrylate | 80N | 7.5 |
| | | Quencher (metal complex) | EST5 | 0.02 | | | |
| Ex. 13 | 1st layer | Cyanine compound | NK2014 | 0.03 | Polymethylmethacrylate | 80N | 7.5 |
| | | | NK2911 | 0.033 | | | |
| | | Quencher (metal complex) | MIR101 | 0.03 | | | |
| | 2nd layer | Diimonium compound | CIR1080 | 0.48 | Polymethylmethacrylate | 80N | 7.5 |
| | | Quencher (metal complex) | EST5 | 0.02 | | | |

TABLE 6

| Example No. | Layer | Near infrared absorption agent | | | Binder resin | | |
|---|---|---|---|---|---|---|---|
| | | Compound name | Product name | g | Compound name | Product name | g |
| Comp. Ex. 8 | 1st layer | Cyanine compound | NK2911 | 0.065 | Polyester | UE3690 | 7.5 |
| | 2nd layer | Diimonium compound | CIR1081 | 0.48 | | | |
| Comp. Ex. 9 | 1st layer | Cyanine compound | NK2911 | 0.063 | Polymethylmethacrylate | 80N | 7.5 |
| | 2nd layer | Diimonium compound | CIR1081 | 0.48 | | | |
| Comp. Ex. 10 | — | Cyanine compound | NK2911 | 0.063 | Polymethylmethacrylate | 80N | 7.5 |
| | | Quencher (metal complex) | MIR101 | 0.03 | | | |
| | | Diimonium compound | CIR1081 | 0.48 | | | |
| Comp. Ex. 11 | — | Cyanine compound | NK2911 | 0.063 | Polymethylmethacrylate | 80N | 7.5 |
| | | Quencher (aminium) | CIR960 | 0.024 | | | |
| | | Diimonium compound | CIR1081 | 0.48 | | | |

In Tables 5 and 6, [NK2014] and [NK2911] are cyanine compounds manufactured by Hayashibara Biochemical laboratories, Inc. [NK2014] is a cyanine compound wherein "A" in the formula (1) is represented by the formula (2) (wherein, "Y" in the formula (2) is a hydrogen atom), and "X$^-$" is $ClO_4^-$. [NK2911] is a cyanine compound wherein "A" in the formula (1) is represented by the formula (3) (wherein, "Y" in the formula (3) is diphenylamine), and "X$^-$" is $ClO_4^-$. [CIR1080], [CIR1081] and [CIR960] are manufactured by Japan Carlit, Co. Ltd., (for [CIR1080] and [CIR960], "X$^-$" in the formula (1) is $ClO_4^-$, and for [CIR1081], "X$^-$" in the formula (1) is $SbF_6^-$). [MIR101] is manufactured by Midori Kagaku, Co. Ltd., [EST5] is manufactured by Sumitomo Seika Chemicals, Co. Ltd., [UE3690] is a polyester resin [Elitel UE3690] manufactured by Unitika Ltd., and [80N] is a polymethylmethacrylate resin [Delpet 80N] manufactured by Asahi Kasei Corporation.

<Evaluation>

Measurement of Initial Spectrophotometric Properties

The near-infrared absorption films obtained were subjected to spectral measurements using a spectrophotometer (U-4000, Hitachi Instruments Service, Co. Ltd.). If no deterioration was observed for any pigment, the film was rated O, and if deterioration was observed for any pigment, it was rated X. Table 7 shows the results.

Measurement of Near-infrared Transmittance and Visible Light Transparency

The near-infrared absorption films obtained were measured and evaluated in an identical way to that of Examples 1 to 8 and Comparative Examples 1 to 7. Table 7 shows the results.

Durability Test

The near-infrared absorption films obtained were measured and evaluated in an identical way to that of Examples 1 to 8 and Comparative Examples 1 to 7. Table 7 shows the results.

TABLE 7

| Example No. | | Ex. 9 | Ex. 10 | Ex. 11 | Ex. 12 | Ex. 13 | Comp. Ex. 8 | Comp. Ex. 9 | Comp. Ex. 10 | Comp. Ex. 11 |
|---|---|---|---|---|---|---|---|---|---|---|
| Near infrared transmittance (%) | 800 nm | 17.9 | 18.7 | 18.6 | 19.4 | 17.5 | 19.3 | 19.9 | 18.6 | 19.4 |
| | 850 nm | 3.4 | 3.8 | 5.7 | 6.1 | 4.0 | 4.0 | 6.4 | 5.7 | 6.1 |
| | 900 nm | 8.2 | 8.8 | 8.1 | 8.4 | 6.5 | 9.3 | 8.9 | 8.1 | 8.4 |
| | 950 nm | 4.1 | 4.1 | 4.6 | 4.5 | 4.7 | 4.3 | 4.8 | 4.6 | 4.5 |
| | 1000 nm | 3.4 | 3.2 | 4.1 | 3.9 | 4.2 | 3.4 | 4.2 | 4.1 | 3.9 |
| | 1100 nm | 2.1 | 2.0 | 2.4 | 2.3 | 2.4 | 2.1 | 2.4 | 2.4 | 2.3 |
| | MAX | 17.9 | 18.7 | 18.6 | 19.4 | 17.5 | 19.3 | 19.9 | 18.6 | 19.4 |
| Luminous transmittance (%) | | 73.0 | 70.7 | 74.7 | 72.2 | 72.1 | 74.2 | 75.5 | 74.7 | 72.2 |
| Chromaticity | x | 0.310 | 0.310 | 0.310 | 0.310 | 0.310 | 0.310 | 0.310 | 0.310 | 0.310 |
| | y | 0.316 | 0.316 | 0.316 | 0.316 | 0.316 | 0.316 | 0.316 | 0.316 | 0.316 |
| Visible light transmittance rating | | ○ | ○ | ○ | ○ | ○ | ○ | ○ | ○ | ○ |
| Near infrared transmittance rating | | ○ | ○ | ○ | ○ | ○ | ○ | ○ | ○ | ○ |
| Initial spectrophotometric properties rating | | ○ | ○ | ○ | ○ | ○ | ○ | ○ | ○ | ○ |
| Durability rating | | ◎ | ◎ | ◎ | ◎ | ◎ | X | X | X | X |

From Table 7, it is seen that in Examples 9 to 13, a near-infrared absorption film having excellent near-infrared blocking properties, visible light transparency, good initial spectrophotometric properties and excellent durability, was obtained.

What is claimed is:

1. A near-infrared absorption film, comprising:
a transparent substrate; and
a near-infrared absorption layer which comprises a cyanine compound represented by the formula (1), and a diimonium compound,

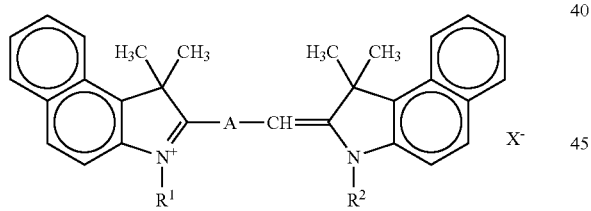

Formula (1)

wherein, in the formula (1), "A" is a divalent bonding group comprising an ethylene group, "$R^1$" and "$R^2$" are monovalent groups containing carbon atoms, and "$X^-$" is a monovalent anion.

2. An near-infrared film according to claim 1, wherein "A" is represented by at least one of the formulae (2) to (4):

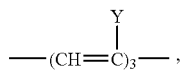

Formula (2)

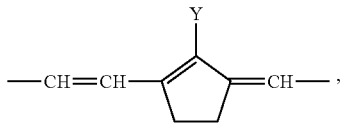

Formula (3)

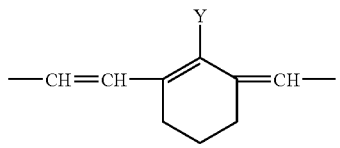

Formula (4)

wherein, in (2) to (4), "Y" is one of an alkyl group, diphenylamino group, halogen atom and hydrogen atom.

3. A near-infrared absorption film according to claim 1, wherein the diimonium compound is represented by at least one of the formulae (I) and (II):

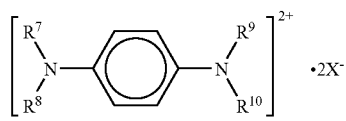

(I)

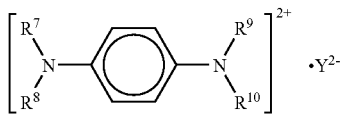

(II)

wherein, in the formulae (I) and (II), "$R^7$" through "$R^{10}$" are at least one of an alkyl group, an aryl group, a group containing an aromatic ring, a hydrogen atom and a halogen atom, "$X^-$" is a monovalent anion, and "$Y^{2-}$" is a divalent anion.

4. A near-infrared absorption film according to claim 1, wherein the amount of the diimonium compound is at least 200 parts by weight relative to 100 parts by weight of the cyanine compound.

5. A near-infrared absorption film according to claim 3, wherein the anion represented by "$X^-$" in formula (1) and the anion represented by "$X^-$" in formula (I) are identical ions.

6. A near-infrared absorption film, comprising:
a transparent substrate; and
a near-infrared absorption layer which comprises a layer containing a cyanine compound represented by the formula (1); and a layer containing a diimonium compound, Formula (1)

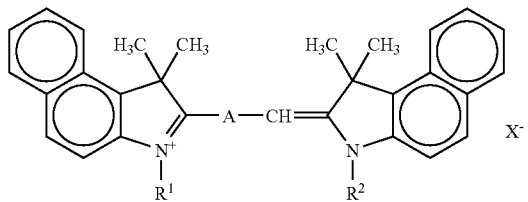

wherein, in the formula (1), "A" is a divalent bonding group comprising an ethylene group, "$R^1$" and "$R^2$" are monovalent groups containing carbon atoms, and "$X^-$" is a monovalent anion.

7. A near-infrared absorption film according to claim 6, wherein the near-infrared absorption layer contains a quencher compound.

8. A near-infrared absorption film according to claim 7, wherein the quencher compound is at least one of a metal compound having a structure represented by at least one of the formulae (5) and (6), and an aminium compound having a structure represented by the formula (7), Formula (5)

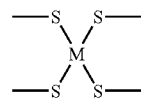

Formula (6)

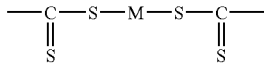

wherein, in the formulae (5) and (6), "M" is at least one of Ni, Cu, Co, Pt and Pd, Formula (7)

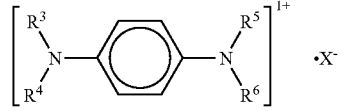

wherein, in the formula (7), "$R^3$" through "$R^6$" are at least one of an alkyl group, an aryl group, a group having an aromatic ring, a hydrogen atom and a halogen atom, "$X^-$" is at least one of $I^-$, $Br^-$, $ClO_4^-$, $BF_4^-$, $PF_6^-$, $SbF_6^-$, $CH_3SO_4{-\!\!-}$, $NO_3^-$, and $CH_3{-\!\!-}C_6H_4{-\!\!-}SO_3^-$.

9. A near-infrared absorption film according to claim 8, wherein the quencher compound is represented by at least one of the formulae (8) to (10):

Formula (8)

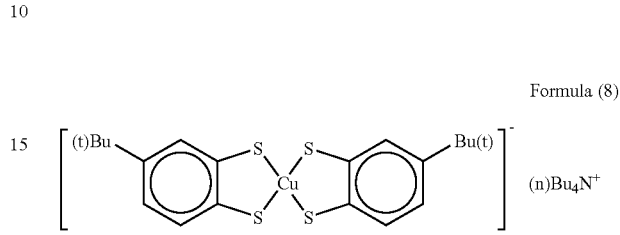

Formula (9)

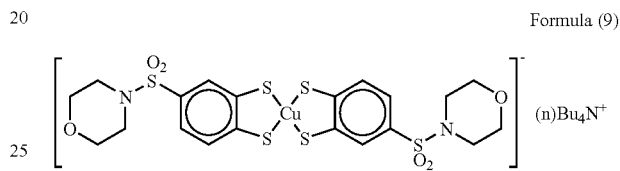

Formula (10)

10. A near-infrared absorption film according to claim 9, wherein the layer containing the cyanine compound contains a quencher compound represented by at least one of the formulae (7) and (10), and the layer containing the diimonium compound contains a quencher compound represented by at least one of the formulae (8) and (9).

11. A near-infrared absorption film according to claim 6, wherein the amount of the cyanine compound is within the range of 0.1 parts by weight to 50 parts by weight relative to 100 parts by weight of the diimonium compound.

* * * * *